(12) United States Patent
Hayakawa et al.

(10) Patent No.: US 9,321,119 B2
(45) Date of Patent: Apr. 26, 2016

(54) COMBINATION WELDING METHOD USING COMBINATION OF GAS METAL ARC WELDING AND SUBMERGED-ARC WELDING AND COMBINATION ARC WELDING MACHINE

(75) Inventors: Naoya Hayakawa, Chiba (JP); Kenji Oi, Chiyoda-ku (JP); Atsushi Ishigami, Chiba (JP); Kenji Shimada, Chiba (JP); Masahiro Odaka, Chiba (JP)

(73) Assignee: JFE Steel Corporation, Tokyo (JP)

( * ) Notice: Subject to any disclaimer, the term of this patent is extended or adjusted under 35 U.S.C. 154(b) by 64 days.

(21) Appl. No.: 13/202,795

(22) PCT Filed: Feb. 25, 2010

(86) PCT No.: PCT/JP2010/053479
§ 371 (c)(1),
(2), (4) Date: Oct. 21, 2011

(87) PCT Pub. No.: WO2010/098499
PCT Pub. Date: Sep. 2, 2010

(65) Prior Publication Data
US 2012/0024822 A1 Feb. 2, 2012

(30) Foreign Application Priority Data

Feb. 27, 2009 (JP) .................................. 2009-045418
Feb. 27, 2009 (JP) .................................. 2009-045422

(51) Int. Cl.
*B23K 9/18* (2006.01)
*B23K 9/173* (2006.01)
(Continued)

(52) U.S. Cl.
CPC ............... *B23K 9/1735* (2013.01); *B23K 9/025* (2013.01); *B23K 9/09* (2013.01); *B23K 9/188* (2013.01);
(Continued)

(58) Field of Classification Search
CPC .......... B23K 9/18; B23K 9/0253; B23K 9/26; B23K 9/0282; B23K 9/16; B23K 9/188

USPC ........................................... 219/73, 74, 76.12
See application file for complete search history.

(56) References Cited

U.S. PATENT DOCUMENTS 4,020,312 A * 4/1977 Araki et al. .................. 219/61
4,071,732 A * 1/1978 Tanaka et al. ............. 219/137 R
4,214,141 A * 7/1980 Okuda et al. ................. 219/73
(Continued)

FOREIGN PATENT DOCUMENTS

JP 53013024 6/1978
JP 53119240 10/1978
(Continued)

OTHER PUBLICATIONS

International Search Report for PCT/JP2010/053479 dated Jun. 8, 2010.

*Primary Examiner* — David Angwin
*Assistant Examiner* — Ayub Maye
(74) *Attorney, Agent, or Firm* — RatnerPrestia

(57) ABSTRACT

Provided are a combination welding method and a combination arc welding machine thereof having excellent construction efficiency and preventing a deterioration of toughness of a HAZ by maintaining the current density of each of gas metal arc welding and submerged-arc welding within an appropriate range at the time of welding a steel plate by the combination of the gas metal arc welding using multielectrodes and the submerged-arc welding using multielectrodes. The gas metal arc welding is performed using two or more electrodes, a wire for welding having a wire diameter of 1.4 mm or more is used in the first electrode of the gas metal arc welding, and a current density of the first electrode is set to 320 A/mm² or more.

6 Claims, 2 Drawing Sheets

(51) Int. Cl.
  *B23K 9/025* (2006.01)
  *B23K 9/09* (2006.01)
  *B23K 28/02* (2014.01)
  *B23K 33/00* (2006.01)

(52) U.S. Cl.
  CPC ............... *B23K 28/02* (2013.01); *B23K 33/004* (2013.01); *B23K 2201/18* (2013.01); *B23K 2203/04* (2013.01)

(56) References Cited

U.S. PATENT DOCUMENTS 4,258,242 A * 3/1981 Fujimori et al. ................ 219/61
8,884,183 B2 * 11/2014 Tolling et al. ............ 219/121.64

FOREIGN PATENT DOCUMENTS

| | | | | |
|---|---|---|---|---|
| JP | 54010263 | | 1/1979 | |
| JP | 58032583 A | | 2/1983 | |
| JP | 59030481 A | | 2/1984 | |
| JP | 60015067 A | | 1/1985 | |
| JP | 6072678 | | 4/1985 | |
| JP | 60072678 A | * | 4/1985 | ............... B23K 9/16 |
| JP | 381070 | | 4/1991 | |
| JP | 03081070 A | * | 4/1991 | ............. B23K 9/073 |
| JP | 03081070 A | | 4/1991 | |
| JP | 05277740 A | * | 10/1993 | ............... B23K 9/18 |
| JP | 985446 | | 3/1997 | |
| JP | 09085446 A | * | 3/1997 | ............ B23K 9/173 |
| JP | 11138266 | | 5/1999 | |

* cited by examiner

1

COMBINATION WELDING METHOD USING COMBINATION OF GAS METAL ARC WELDING AND SUBMERGED-ARC WELDING AND COMBINATION ARC WELDING MACHINE

CROSS-REFERENCE TO RELATED APPLICATIONS

This application is the U.S. National Phase application of PCT International Application No. PCT/JP2010/053479, filed Feb. 25, 2010, and claims priority to Japanese Patent Application No. 2009-045418, filed Feb. 27, 2009, and Japanese Patent Application No. 2009-045422, filed Feb. 27, 2009, the disclosures of which PCT and priority applications are incorporated herein by reference in their entirely for all purposes.

FIELD OF THE INVENTION

The present invention relates to a hybrid or combination welding method of performing welding on a steel plate by the combination of gas-metal arc welding (or gas shield arc welding or gas-shielded metal arc welding) and submerged-arc welding and a hybrid or combination arc welding machine thereof.

BACKGROUND OF THE INVENTION

Generally, submerged-arc welding is a welding technique with excellent construction efficiency since high-heat input welding may be performed which conducts welding in one pass by setting a large welding current. Furthermore, since melted metal is protected by slag, there are advantages in that nitrogen or oxygen is suppressed from being mixed into the melted metal and a stable arc is obtained. For this reason, since a weld defect is suppressed and weld metal with an excellent mechanical property is obtained, the submerged-arc welding is widely used in various fields (for example, shipbuilding, architecture, civil engineering, and the like).

In recent years, there has been a tendency that the thickness of the steel plate subjected to the submerged-arc welding has increased with an increase in size of a welded structure, so that there are demands for a new high-heat input welding technique.

Incidentally, when the heat input amount increases during welding, the toughness of a welded heat affected zone (hereinafter, referred to as HAZ) is deteriorated, so that a sufficient performance is not obtained at a weld joint. Although a method may be supposed which prevents the deterioration of the toughness of the HAZ by performing multilayer welding and fractionating a heat input amount, the efficiency of the submerged-arc welding is drastically deteriorated. Therefore, a technique has been considered which uses both submerged-arc welding and gas metal arc welding to prevent the deterioration of the toughness of the HAZ and improve the efficiency of the weld construction.

For example, PTLs 1 to 7 disclose a technique that simultaneously prevents the deterioration of the toughness of the HAZ and improves the efficiency of the weld construction by performing gas metal arc welding and submerged-arc welding on the same weld line. However, in such a technique, since an inert gas mainly containing Ar is used as a shielding gas of the gas metal arc welding (MIG welding (metal inert gas welding)), a penetrative energy caused by an arc pressure is weak and penetration is not deep. Alternatively, since the current density of the gas metal arc welding is small, the penetration is not deep, so that the fractionation effect of the heat input in the thickness direction of the steel plate may not be sufficiently obtained and the improvement of the toughness of the HAZ may not be attained.

Further, in PTL 5, since a wire with a large diameter of 3 to 6.4 mm is adopted as the electrode of the gas metal arc welding, the current density is low, so that there are problems in that the arc pressure reduces and the depth of penetration decreases.

Further, in PTL 6, since the electrode of the gas metal arc welding is vibrated in the direction perpendicular to the weld proceeding direction, there are problems in that the arc pressure reduces and the depth of penetration decreases.

PATENT LITERATURE

[PTL 1] JP-A-S58-32583
[PTL 2] JP-A-H3-81070
[PTL 3] JP-A-S60-15067
[PTL 4] JP-A-S59-30481
[PTL 5] JP-A-S54-10263
[PTL 6] JP-A-S53-13024
[PTL 7] JP-A-S53-119240

SUMMARY OF THE INVENTION

This invention provides a hybrid or combination welding method and a welding machine thereof having excellent construction efficiency and preventing a deterioration of toughness of a HAZ 30 by deepening the penetration of gas metal arc welding to deeply input the heat of the gas metal arc welding into a steel plate in the thickness direction and inputting the heat of submerged-arc welding to the surface layer side thereof to be fractionated so that the structure of a HAZ 30 (a welded heat affected zone) becomes smaller at the time of welding the steel plate by the combination of the gas metal arc welding using multielectrodes and the submerged-arc welding using multielectrodes.

The inventors have reviewed a technique for preventing a deterioration of toughness of a HAZ in hybrid and combination welding using the combination of gas metal arc welding and submerged-arc welding.

As a result, (a) When the arc pressure becomes stronger by increasing the current density of a first electrode 12 of gas metal arc welding to have a large depth of penetration, the heat of the gas metal arc welding is deeply input in the thickness direction of a steel plate, and the heat of submerged-arc welding is input to the surface layer side thereof to be fractionated, so that a deterioration of toughness of a HAZ 30 is prevented.

However, when the depth of penetration of the gas metal arc welding is deepened in this manner, gas metal arc welding metal has a shape in which a bead extends in the thickness direction of the steel plate, and the possibility of generating a hot crack drastically increases.

Therefore, (b) When the center-to-center spacing (hereinafter, referred to as a distance between electrodes) between the last electrode of the gas metal arc welding and the first electrode of the submerged-arc welding at the surface of the steel plate is narrowed, the solidification direction of the weld metal formed by the gas shield arc is controlled to be upward, and the hot crack is suppressed.

(c) Alternatively, when the arc pressure becomes stronger by increasing the current density of a first electrode 16 of the submerged-arc welding to have a large depth of penetration, the hot crack generated at the upside of the weld metal of the gas metal arc welding is melted again, so that a high-quality weld portion without a hot crack is obtained.

(d) Further, in the gas metal arc welding metal having a feature that the penetration is deep and the shape is thin and elongated, the solidification speed is fast and blowholes are easily generated. However, when multielectrodes are used, a time necessary for the rising of a gas 24 is ensured by making molten pool 23 have an elongated shape in the weld direction, so that a weld defect such as a blowhole is suppressed.

The invention provides a combination welding method and a combination arc welding machine thereof, where gas metal arc welding is performed on a butted portion between steel plates. In the combination welding method according to one embodiment, submerged-arc welding is performed behind the gas metal arc welding, the gas metal arc welding is performed by using two or more electrodes, a wire for welding having a wire diameter of 1.4 mm or more is used in a first electrode 12 of the gas metal arc welding, and the current density of the first electrode 12 of the gas metal arc welding is set to 320 A/mm$^2$ or more. In the combination arc welding machine according to one embodiment, a gas metal arc welding machine using two or more electrodes is disposed at the front position to perform the welding, and a submerged-arc welding machine using multielectrodes is disposed at the rear position.

In the combination welding method and the combination arc welding machine according to the invention, a distance between the last electrode of the gas metal arc welding and the first electrode 16 of the submerged-arc welding is preferably from 40 to 100 mm.

Further, in the combination welding method and the combination arc welding machine according to the invention, the submerged-arc welding may be performed using two or more electrodes, and the current density of the first electrode 16 of the submerged-arc welding is preferably 75 A/mm$^2$ or more.

Further, in the combination welding method and the combination arc welding machine according to the invention, a distance between the first and second electrodes 12 and 13 of the gas metal arc welding is preferably 30 mm or less.

Further, in the combination welding method and the combination arc welding machine according to the invention, the first and second electrodes 12 and 13 of the gas metal arc welding are preferably set to have different polarities.

Further, in the combination welding method and the combination arc welding machine according to the invention, power supplies of the first and second electrodes 12 and 13 of the gas metal arc welding are preferably pulsed power supplies respectively, and peak currents of the first and second electrodes 12 and 13 of the gas metal arc welding may be supplied to be deviated from each other in time.

Furthermore, in the combination welding method and the combination arc welding machine according to the invention, the current ratio between the first and second electrodes 16 and 17 of the submerged-arc welding is preferably from 0.6 to 0.8.

Since gas metal arc welding using multielectrodes and submerged-arc welding using multielectrodes are both used and the current density of the first electrode 12 of the gas metal arc welding and the current density of the first electrode 16 of the submerged-arc welding are all increased at the time of welding the steel plate, the deterioration of the toughness of the HAZ 30 may be prevented and construction may be highly efficiently performed. Furthermore, a satisfactory weld metal without a weld defect is obtained.

DETAILED DESCRIPTION OF THE INVENTION

Figure 3:
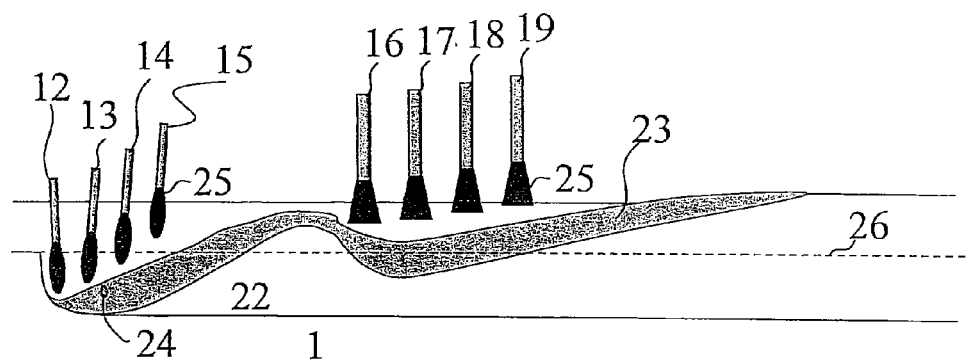
FIG. 3 is a cross-sectional view illustrating a molten pool 23 during welding of the combination welding method according to an embodiment of the invention.

In the invention, welding is preferably performed in one pass by the combination of gas metal arc welding and submerged-arc welding in order to fractionate a heat input in the thickness direction of a steel plate. However, when the submerged-arc welding is performed before the gas metal arc welding, the succeeding gas metal arc welding is performed while flux and slag remain on the surface of melted metal, which inhibits the generation of arc in the gas metal arc welding. For this reason, as shown in FIGS. 3 and 4, the gas metal arc welding not using flux and not generating slag is performed before the submerged-arc welding, and the submerged-arc welding is performed before the melted metal of the gas metal arc welding is solidified.

In the gas metal arc welding and the submerged-arc welding, gas metal arc welding using multielectrodes (in FIGS. 3 and 4: 12, 13, 14, and 15) equal to or more than two electrodes (that is, wires for welding) and submerged-arc welding using multielectrodes (in FIGS. 3 and 4: 16, 17, 18, and 19) are performed. Since the gas metal arc welding and the submerged-arc welding both use multielectrodes, the rate of deposition increases, so that the weld efficiency improves. In addition, since a molten pool 23 is formed in an elongated shape in the weld direction, it is possible to ensure a time necessary for causing rising of a gas 24 or molten slag, and hence suppress blowholes or entrapment of slag from being generated in weld metals 21 and 22. As a result, it is possible to prevent a weld defect from being generated in the weld metals 21 and 22 formed by solidifying the melted metal 23. Further, when the heat input in the thickness direction of the steel plate is fractionated, effects for suppressing grain coarsening of a structure of a HAZ 30 and preventing a deterioration of toughness of the HAZ 30 are obtained.

Figure 4:
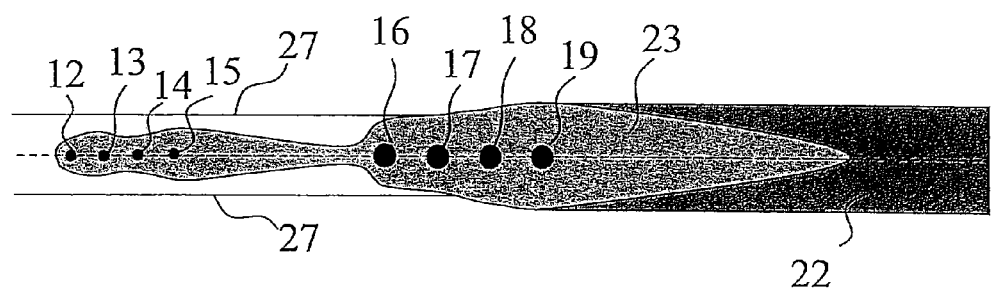
FIG. 4 is a plan view illustrating the molten pool 23 during welding of the combination welding method according to an embodiment of the invention.

As shown in FIG. 4, it is desirable that the electrodes (12, 13, 14, and 15) of the gas metal arc welding and the electrodes (16, 17, 18, and 19) of the submerged-arc welding be all disposed on the same weld line. The reason is as follows. When the electrode is deviated from the weld line, the heat input amount at the weld line is not sufficient, so that the flow of the molten metal inside the molten pool 23 to rear welding is disturbed, which causes various weld defects and a deterioration of a bead shape.

Hereinafter, exemplary embodiments of the invention will be described in detail.

In the preceding gas metal arc welding, since there is a need to fractionate the heat input in the thickness direction of the steel plate in order to prevent the deterioration of the toughness of the HAZ 30, the depth of penetration is set to be large. Therefore, the wire diameter of the wire for welding used as a first electrode 12 of the gas metal arc welding using multielectrodes and the current density of the first electrode 12 of the gas metal arc welding are defined. Furthermore, the first electrode 12 of the gas metal arc welding indicates the electrode disposed at the foremost position of a plurality of electrodes of the gas metal arc welding in the proceeding direction.

When the wire diameter of the wire 33 for welding used in the first electrode 12 of the gas metal arc welding is less than 1.4 mm, the current density may be increased, but the welding current is not easily increased and the arc pressure is deteriorated, so that a sufficient depth of penetration is not obtained. Accordingly, the wire diameter of the wire is set to 1.4 mm or more. On the other hand, if a high current is applied when the wire diameter becomes more than 2.4 mm, an excessive heat amount is input, so that the toughness of the HAZ 30 is deteriorated. Also, since the current density reduces at a low current, sufficient penetration is not obtained. Accordingly, it is desirable that the wire diameter of the wire 33 used in the first electrode 12 of the gas metal arc welding be in the range from 1.4 to 2.4 mm.

Further, when the current density of the welding current supplied to the first electrode 12 of the gas metal arc welding is less than 320 $A/mm^2$, the arc pressure reduces, so that the sufficient depth of penetration is not obtained. Accordingly, the current density is set to be 320 $A/mm^2$ or more. When the current density becomes excessively large, the arc pressure becomes strong, so that the depth of penetration becomes larger. Then, the melted metal 23 which is elongated in the thickness direction of the steel plate 1 is formed, and the solidification speed of the front end of the melted metal 23 becomes faster. For this reason, the gas 24 included in the melted metal 23 is captured, so that blowholes are easily generated in the weld metal 21. In the invention, since the gas metal arc welding using multielectrodes is adopted, it is possible to adjust the solidification speed of the melted metal 23 or the flow of melted metal thereof by using the input heat after the second electrode 13 of the succeeding gas metal arc welding, and it is possible to suppress the generation of the blowholes. However, when the current density of the welding current supplied to the first electrode 12 of the gas metal arc welding becomes more than 700 $A/mm^2$, the arc pressure is too strong. Therefore, even in the gas metal arc welding using multielectrodes, the movement of the molten pool 23 becomes much too fierce, so that a fusion defect or blowholes are generated or a bead is irregular. Accordingly, it is desirable that the current density of the welding current supplied to the first electrode 12 of the gas metal arc welding be in the range from 320 to 700 $A/mm^2$. Here, the current density indicates the welding current per the unit area of the cross-section of the wire for welding.

Furthermore, here, the gas metal arc welding used in the invention is not particularly limited. However, carbon gas welding is desirable in which $CO_2$ gas having a strong arc pressure and obtaining deep penetration is used as a shielding gas. Further, in order to stabilize the arc, the $CO_2$ gas may be mixed with Ar gas whose content may be up to 60 vol %. Accordingly, the composition of the shielding gas is desirable when the $CO_2$ gas is 100 to 40 vol % and the Ar gas as a remainder is 0 to 60 vol %.

Further, the wire 33 for welding of the gas metal arc welding is not particularly limited. In accordance with the application purpose, a solid wire or a flux cored wire may be used. Further, the number of weld electrodes may be appropriately selected in accordance with the thickness of the steel plate or the shape of the groove, and two or more electrodes are desirable from the viewpoint of the productivity or quality of the welding. The number of electrodes is not limited. However, when the number of electrodes increases, a gas metal arc welding machine becomes more expensive and the configuration of the welding machine becomes more complex. For this reason, four or less electrodes are desirable.

Further, when the distance between the last electrode of the preceding gas metal arc welding and the first electrode of the succeeding submerged-arc welding using multielectrodes is less than 40 mm, the effect of fractionating the heat input in the thickness direction of the steel plate is not obtained. On the other hand, when the distance between the electrodes becomes more than 100 mm, there is concern that a hot crack produced by the gas metal arc welding is not melted, but remains in the weld metal. Accordingly, it is desirable that the distance between the last electrode of the gas metal arc welding and the first electrode of the submerged-arc welding be in the range from 40 to 100 mm. Furthermore, a first electrode 16 of the submerged-arc welding indicates the electrode disposed at the foremost position of the plurality of electrodes of the submerged-arc welding in the proceeding direction.

Further, when the distance between the first electrode 12 of the gas metal arc welding and the second electrode 13 of the gas metal arc welding becomes more than 30 mm, the weld metal formed by the first electrode 12 is not melted by the second electrode 13. Therefore, when a weld defect is contained in the weld metal 21 formed by the first electrode 12, the weld defect remains in the weld metal 21. Accordingly, it is desirable that the distance between the first electrode 12 of the gas metal arc welding and the second electrode 13 of the gas metal arc welding be 30 mm or less. On the other hand, when the distance is less than 8 mm, the arc is disturbed by magnetic blow, which causes various weld defects. Accordingly, it is more desirable that the distance between the first electrode 12 of the gas metal arc welding and the second electrode 13 of the gas metal arc welding be in the range from 8 to 30 mm.

When the polarity of the first electrode 12 of the gas metal arc welding is the same as the polarity of the second electrode 13 of the gas metal arc welding, the arcs 25 attract each other, so that the melted metal 23 rises to thereby easily form a pouring basin. Since the first electrode 12 of the gas metal arc welding irregularly comes into contact with the second electrode 13 of the gas metal arc welding due to the fluctuation of the pouring basin, the arc 25 becomes unstable. On the contrary, when the polarity of the first electrode 12 of the gas metal arc welding is set to be opposite to the polarity of the second electrode 13 of the gas metal arc welding, the arcs 25 repel each other, so that the melted metal 23 is press-inserted to thereby hardly form the pouring basin. Therefore, it is desirable that the polarity of the first electrode 12 of the gas metal arc welding be different from the polarity of the second electrode 13 of the gas metal arc welding. Furthermore, when the first electrode 12 of the gas metal arc welding has reversed polarity (that is, the electrode is set as a positive electrode) and the second electrode 13 of the gas metal arc welding has straight polarity (that is, the electrode is set as a negative electrode), it is more desirable that the depth of penetration becomes larger.

Furthermore, when the polarity of the first electrode 12 of the gas metal arc welding is the same as the polarity of the second electrode 13 of the gas metal arc welding, it is desirable that pulsed power supplies be used in the first electrode 12 of the gas metal arc welding and the second electrode 13 of the gas metal arc welding and the peak currents (that is, welding currents) thereof be deviated from each other in time. The reason is because the phenomenon that the arcs 25 attract each other may be suppressed.

In this manner, when the gas metal arc welding using multielectrodes is performed, it is possible to sequentially solidify the melted metal from the lower portion toward the upper portion in the thickness direction. The hot crack is prevented by performing the submerged-arc welding before the melted metal 23 is completely solidified.

Figure 5:
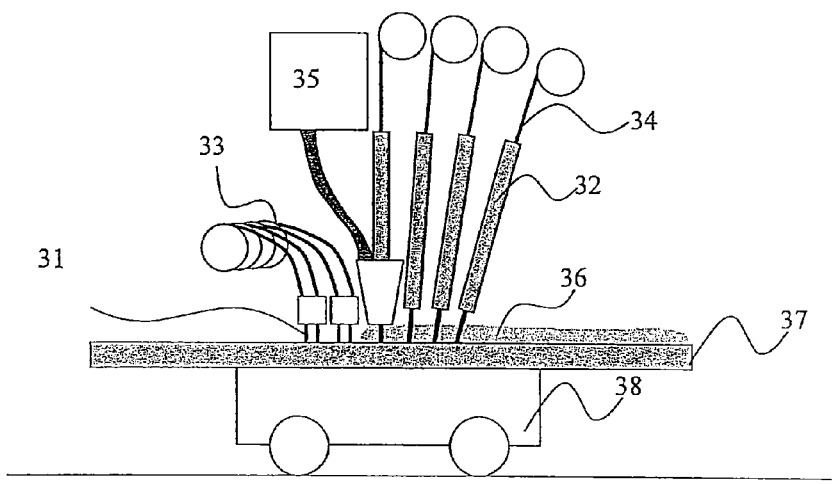
FIG. 5 is a diagram illustrating an example of a combination arc welding machine according to an embodiment of the invention.

In the succeeding submerged-arc welding behind the gas metal arc welding, the welding speed is set to be equal to that of the gas metal arc welding. Then, in the submerged-arc welding, it is desirable that the penetration be performed up to the position where the hot crack is easily generated in the gas metal arc welding portion. Accordingly, it is desirable that the gas metal arc welding machine and the submerged-arc welding machine be disposed as shown in FIG. 5 and a work 37 be welded while being loaded and moved on a carriage 38. Alternatively, when the work is not moved, it is desirable that the gas metal arc welding machine and the submerged-arc welding machine be loaded on one carriage 37 and welding be performed while moving the combination arc welding machine (not shown).

When the current density of the welding current supplied to the first electrode 16 of the submerged-arc welding using the multielectrodes is less than 75 $A/mm^2$, the arc pressure is weak and the deep depth of penetration is not obtained. Therefore, it is not possible to sufficiently obtain an effect that prevents the hot crack of the weld metal 21 of the gas metal arc welding or prevents the hot crack by melting the hot crack again. Accordingly, it is desirable that the current density be 75 $A/mm^2$ or more. When the current density becomes excessively larger, the penetration becomes too deep and the heat is input up to the lower side, so that the heat fractionation effect is not obtained. Further, the arc pressure is high, the melted metal 23 behind the arc 25 flows fiercely backward, and the molten pool 23 is vibrated, so that slag or a residual material of a surface of a groove is entangled. Therefore, the flux or slag is included in the melted metal 23 to thereby easily generate a weld defect in the weld metal 22. However, since the submerged-arc welding using the multielectrodes is adopted, it is possible to adjust the solidification speed of the melted metal 23 using the input heat after a second electrode 17 of the succeeding submerged-arc welding and thus suppress the generation of the weld defect. When the current density of the welding current supplied to the first electrode 16 of the submerged-arc welding becomes more than 350 $A/mm^2$, the heat fractionation effect reduces and the toughness of the HAZ 30 is deteriorated. Accordingly, it is desirable that the current density of the welding current supplied to the first electrode 16 of the submerged-arc welding be in the range from 75 to 350 $A/mm^2$. Furthermore, the first electrode 16 of the submerged-arc welding indicates the electrode disposed at the foremost position of the plurality of electrodes of the submerged-arc welding in the proceeding direction.

When the value of $I_2/I_1$ (hereinafter, referred to as a current ratio) calculated from the welding current $I_1(A)$ supplied to the first electrode 16 of the submerged-arc welding and the welding current $I_2$ (A) supplied to the second electrode 17 of the submerged-arc welding is less than 0.6, a weld defect such as slag inclusion is easily generated. On the other hand, when the current ratio becomes more than 0.8, a weld defect such as an undercut is easily generated. Accordingly, it is desirable that the current ratio be in the range from 0.6 to 0.8.

Furthermore, here, the submerged-arc welding used in the invention is not particularly limited. However, as the flux 36, fused flux, bonded flux, or the like may be used. In particular, when the low temperature toughness is important, basic flux containing a large amount of CaO or $CaF_2$ is desirable as the flux 36. Further, the wire 34 for welding is not particularly limited. In accordance with the application purpose, a solid wire or a flux cored wire may be used. Further, the number of weld electrodes may be appropriately selected in accordance with the thickness of the steel plate or the shape of the groove, and two or more electrodes are desirable from the viewpoint of the productivity or quality of the welding. The number of electrodes of the submerged-arc welding is not limited. However, when the number of electrodes increases, a submerged-arc welding machine becomes more expensive and the configuration of the welding machine becomes more complex. For this reason, four or less electrodes are desirable.

As described above, in the invention, the deterioration of the toughness of the HAZ 30 is prevented by fractionating the heat input in the thickness direction of the steel plate by using both the gas metal arc welding and the submerged-arc welding. Furthermore, since the welding may be performed in one pass, the welding technique has excellent construction efficiency.

Furthermore, the invention also has an effect of suppressing the generation of a weld defect. Accordingly, a satisfactory weld joint is obtained.

EXAMPLES

Example 1

Figure 1:
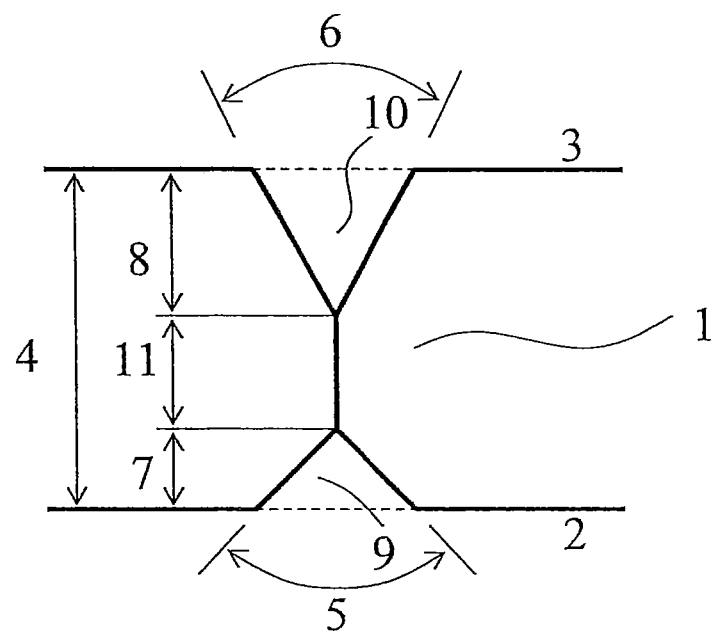
FIG. 1 is a cross-sectional view schematically illustrating a shape of a groove adopting a combination welding method according to an embodiment of the invention.

The steel plates having the components shown in Table 1 were welded while abutting on each other. The groove shape is as shown in FIG. 1; the groove angles 5 and 6, the groove depths 7 and 8, the groove areas 9 and 10, and the length of the root face 11 are shown in Table 4. The thickness 4 of the steel plate 1 was set to 25 mm, 33 mm, and 38 mm. In three types of steel plates 1 having different thicknesses 4, the yield strength was from 620 to 650 MPa, and the tensile strength was from 710 to 740 MPa.

In the welding of the back side 2, the invention was not applied, but submerged-arc welding using three electrodes was performed. The welding conditions are shown in Table 2. As the wire for welding, the wire for welding having a wire diameter of 4.0 mm was used among the wires for welding shown in Table 3. As the flux, basic fused flux mainly containing $CaO$—$CaF_2$—$SiO_2$—$Al_2O_3$ was used.

Figure 2:
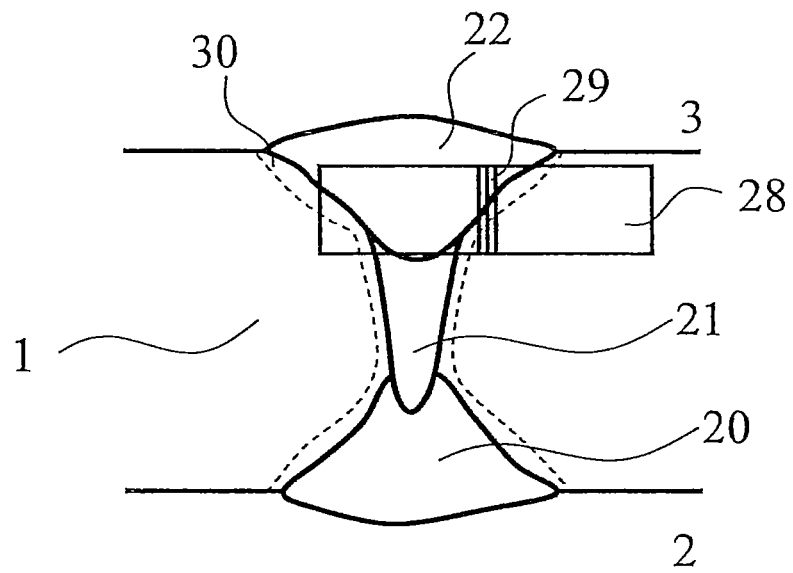
FIG. 2 is a cross-sectional view illustrating a weld portion subjected to a combination welding method according to an embodiment of the invention and a diagram illustrating a position of collecting a Charpy impact test piece.

In the finishing side 3, the invention was applied, and welding was performed in one pass by using both gas metal arc welding and submerged-arc welding. The welding conditions of the preceding gas metal arc welding are shown in Table 5, and the welding conditions of the succeeding submerged-arc welding are shown in Table 6. Furthermore, in gas metal arc welding, 100 volt of $CO_2$ was used as a shielding gas at the flow rate of 25 liters/minute, the first electrode 12 of the gas metal arc welding was made to have reversed polarity, and the second electrode 13 of the gas metal arc welding was made to have straight polarity. After the welding was completed, a V-notch Charpy impact test piece 28 of JIS Z2202 (1980) was collected from the HAZ 30 of the finishing side 3 and was subjected to a Charpy impact test at −40° C. The result is also shown in Table 6. FIG. 2 illustrates the collection position (2 mm away from the surface of the steel plate in the thickness direction) of the Charpy impact test piece 28. Furthermore, the notch 29 was set to a position where the base material (including the HAZ) and the weld metal were present in the ratio of one to one.

The distance between the electrodes of Table 5 indicates a gap between the first electrode 12 of the preceding gas metal arc welding and the second electrode 13 of the gas metal arc welding, a gap between the second electrode 13 of the gas metal arc welding and a third electrode 14 of the gas metal arc welding, and a gap between the third electrode 14 of the gas metal arc welding and a fourth electrode 15 of the gas metal arc welding. The distance between electrodes of Table 6 indicates a gap between the last electrode of the preceding gas metal arc welding and the first electrode 16 of the succeeding submerged-arc welding.

Further, the thickness 4 of the steel plate of Table 5 corresponds to Table 4, and the dimension of each groove is shown in Table 4. The wire diameter of Tables 5 and 6 corresponds to that of Table 3, and the component of each wire for welding is shown in Table 3.

The inventive example is an example in which the wire diameter of the wire 33 for welding used in the first electrode 12 of the gas metal arc welding and the current density of the first electrode 12 of the gas metal arc welding satisfy the range of the invention. As obvious from Table 6, Inventive Example (that is, the welding Nos. 1 to 3) has an extremely satisfactory toughness when the strength or the component of the steel plate 1 is taken into consideration.

In the welding No. 4 of Comparative Example, since the wire diameter of the wire 33 for welding used in the gas metal arc welding was 1.2 mm, the current density of the first electrode 12 of the gas metal arc welding was sufficient, but the depth of penetration was reduced due to a decrease in welding current. For this reason, the heat input of the submerged-arc welding was not fractionated and the toughness of the HAZ was deteriorated. Further, since the current density of the first electrode 16 of the submerged-arc welding was not sufficient, a weld defect was generated in the weld metal.

In the welding No. 5 of Comparative Example, since the current density of the first electrode 12 of the gas metal arc welding was not sufficient, the depth of penetration was reduced. For this reason, even when the submerged-arc welding was performed with appropriate conditions, the toughness of the HAZ was deteriorated.

In the welding No. 6 of Inventive Example, satisfactory toughness of the HAZ was obtained. However, since the distance between the first electrode 12 and the second electrode 13 of the gas metal arc welding was 35 mm, slightly small blowholes were found.

In the welding No. 7 of Inventive Example, the satisfactory toughness of the HAZ was obtained.

Next, the first electrode 12 of the gas metal arc welding and the second electrode 13 of the gas metal arc welding were made to have reversed polarities, and welding was performed on the steel plate 1 with the same conditions as that of the welding No. 1. In this case, the arc 25 in the gas metal arc welding became unstable. For this reason, even when no problem occurred in the submerged-arc welding, blowholes were found in the weld metal 21.

Furthermore, the first electrode 12 of the gas metal arc welding and the second electrode 13 of the gas metal arc welding were made to have reversed polarities, pulsed power supplies were used so that the peak currents of the first electrode 12 of the gas metal arc welding and the second electrode 13 of the gas metal arc welding were deviated from each other in time, and welding was performed on the steel plate 1 with the same conditions as that of the welding No. 1. In this case, the arc 25 in the gas metal arc welding was stable, and no blowhole was generated in the weld metal 21.

Example 2

The steel plates having the components shown in Table 1 were welded while abutting on each other. The groove shape was as shown in FIG. 1; the groove angles 5 and 6, the groove depths 7 and 8, the groove areas 9 and 10, and the length of the root face 11 are shown in Table 4. The thickness 4 of the steel plate 1 was set to 25 mm, 33 mm, and 38 mm. In three types of steel plates 1 having different thicknesses 4, the yield strength was from 620 to 650 MPa, and the tensile strength was from 710 to 740 MPa.

In the welding of the back side 2, the invention was not applied, but submerged-arc welding using three electrodes was performed. The welding conditions are shown in Table 2. As the wire for welding, the wire for welding having a wire diameter of 4.0 mm was used among the wires for welding shown in Table 3. As the flux, basic fused flux mainly containing $CaO$—$CaF_2$—$SiO_2$—$Al_2O_3$ was used.

In the finishing side 3, the invention was applied, and welding was performed in one pass by using both gas metal arc welding and submerged-arc welding. The welding conditions of the preceding gas metal arc welding are shown in Table 7, and the welding conditions of the succeeding submerged-arc welding are shown in Table 8. Furthermore, in gas metal arc welding, 100 vol % of $CO_2$ was used as a shielding gas at the flow rate of 25 liter/minute, the first electrode 12 of the gas metal arc welding was made to have reversed polarity, and the second electrode 13 of the gas metal arc welding was made to have straight polarity. After the welding was completed, as in Example 1, the test piece 28 was collected from the HAZ 30 of the finishing side 3, and was subjected to a Charpy impact test at −40° C. The result is also shown in Table 8.

The distance between the electrodes of Table 7 indicates a gap between the first electrode 12 of the preceding gas metal arc welding and the second electrode 13 of the gas metal arc welding, a gap between the second electrode 13 of the gas metal arc welding and the third electrode 14 of the gas metal arc welding, and a gap between the third electrode 14 of the gas metal arc welding and the fourth electrode 15 of the gas metal arc welding. The distance between the electrodes of Table 8 indicates a gap between the last electrode of the preceding gas metal arc welding and the first electrode of the succeeding submerged-arc welding.

Further, the thickness 4 of the steel plate of Table 7 corresponds to Table 4, and the dimension of each groove is shown in Table 4. The wire diameter of Tables 7 and 8 corresponds to that of Table 3, and the component of each wire for welding is shown in Table 3.

The inventive example is an example in which the wire diameter of the wire 33 for welding used in the first electrode 12 of the gas metal arc welding and the current density of the first electrode 12 of the gas metal arc welding satisfy the range of the invention. As obvious from Table 8, Inventive Example (that is, the welding Nos. 8 to 10, 13, and 14) has an extremely satisfactory toughness when the strength or the component of the steel plate 1 is taken into consideration.

In the welding No. 11 of Comparative Example, since the wire diameter of the wire 33 for welding used in the gas metal arc welding was 1.2 mm, the current density of the first electrode 12 of the gas metal arc welding was sufficient, but the depth of penetration was reduced due to a decrease in welding current. For this reason, the heat input of the submerged-arc welding was not fractionated and the toughness of the HAZ was deteriorated. Further, since the current density of the first electrode 16 of the submerged-arc welding was not sufficient, a weld defect was generated in the weld metal.

In the welding No. 12 of Comparative Example, since the current density of the first electrode 12 of the gas metal arc welding was not sufficient, the depth of penetration was reduced. For this reason, even when the submerged-arc welding was performed with appropriate conditions, the toughness of the HAZ was deteriorated.

In the welding No. 13 of Inventive Example, satisfactory toughness of the HAZ was obtained. However, since the distance between the first electrode 12 and the second electrode 13 of the gas metal arc welding was 35 mm, slight occurrence of blowholes was found.

Next, the first electrode 12 of the gas metal arc welding and the second electrode 13 of the gas metal arc welding were made to have reversed polarities, and welding was performed on the steel plate 1 with the same conditions as that of the welding No. 1. In this case, the arc 25 in the gas metal arc welding became unstable. For this reason, even when no problem occurred in the submerged-arc welding, blowholes were found in the weld metal 21.

Furthermore, the first electrode 12 of the gas metal arc welding and the second electrode 13 of the gas metal arc welding were made to have reversed polarities, pulsed power supplies were used so that the peak currents of the first electrode 12 of the gas metal arc welding and the second electrode 13 of the gas metal arc welding were deviated from each other in time, and welding was performed on the steel plate 1 with the same conditions as that of the welding No. 1. In this case, the arc 25 in the gas metal arc welding was stable, and no blowhole was generated in the weld metal 21.

Since a combination welding method and a combination arc welding machine may be obtained which has excellent construction efficiency and prevents a deterioration of toughness of a HAZ 30 at the time of welding a steel plate, an industrially significant advantage may be obtained.

REFERENCE SIGNS LIST

1: steel plate
2: back side
3: finishing side
4: thickness of steel plate
5, 6: groove angle
7, 8: groove depth
9, 10: groove area
11: root face
12: wire for welding of first electrode of gas metal arc welding
13: wire for welding of second electrode of gas metal arc welding
14: wire for welding of third electrode of gas metal arc welding
15: wire for welding of fourth electrode of gas metal arc welding
16: wire for welding of first electrode of submerged-arc welding
17: wire for welding of second electrode of submerged-arc welding
18: wire for welding of third electrode of submerged-arc welding
19: wire for welding of fourth electrode of submerged-arc welding
20: weld metal of back side
21: weld metal of gas metal arc welding
22: weld metal of finishing side
23: melted metal (molten pool)
24: gas, 25: arc, 26: groove bottom, 27: groove edge
28: charpy impact test piece
29: notch
30: welded heat affected zone (HAZ)
31: gas metal arc welding electrode
32: submerged-arc welding electrode
33: wire for gas metal arc welding
34: wire for submerged-arc welding
35: flux hopper for submerged-arc welding
36: flux
37: work
38: carriage

TABLE 1

| Composition (mass %) | | | | | | | | | |
|---|---|---|---|---|---|---|---|---|---|
| C | Si | Mn | P | S | Cu | Ni | Cr | Mo | Nb |
| 0.06 | 0.10 | 1.84 | 0.008 | 0.002 | 0.08 | 0.08 | 0.03 | 0.19 | 0.027 |

TABLE 2

| Thickness of steel plate (mm) | First electrode | | Second electrode | | Third electrode | | Welding speed (cm/minute) | Welding heat input (kJ/cm) |
|---|---|---|---|---|---|---|---|---|
| | Current (A) | Voltage (V) | Current (A) | Voltage (V) | Current (A) | Voltage (V) | | |
| 25 | 1250 | 30 | 900 | 35 | 650 | 38 | 170 | 33.1 |
| 33 | 1250 | 30 | 950 | 35 | 650 | 37 | 140 | 40.6 |
| 38 | 1250 | 30 | 1050 | 42 | 800 | 44 | 125 | 56.1 |

TABLE 3

| Wire diameter (mm) | Composition (mass %) | | | | | |
|---|---|---|---|---|---|---|
| | C | Si | Mn | P | S | Mo |
| 1.2 | 0.11 | 0.6 | 1.6 | 0.011 | 0.003 | 0.15 |
| 1.4 | 0.11 | 0.6 | 1.6 | 0.011 | 0.003 | 0.15 |
| 1.6 | 0.11 | 0.6 | 1.6 | 0.011 | 0.003 | 0.15 |
| 2.0 | 0.11 | 0.6 | 1.6 | 0.011 | 0.003 | 0.15 |
| 2.4 | 0.11 | 0.6 | 1.6 | 0.011 | 0.003 | 0.15 |
| 3.2 | 0.50 | 0.3 | 1.8 | 0.010 | 0.003 | 0.50 |
| 4.0 | 0.50 | 0.3 | 1.8 | 0.010 | 0.003 | 0.50 |

TABLE 4

| Thickness of steel plate (mm) | Back side | | | Finishing side | | | Root face (mm) |
|---|---|---|---|---|---|---|---|
| | Groove angle (°) | Groove depth (mm) | Groove area (mm²) | Groove angle (°) | Groove depth (mm) | Groove area (mm²) | |
| 25 | 60 | 7.0 | 28.3 | 70 | 10 | 70.0 | 8.0 |
| 33 | 60 | 8.5 | 41.7 | 60 | 15 | 129.9 | 9.5 |
| 38 | 50 | 11.0 | 56.4 | 50 | 17 | 134.8 | 10.0 |

TABLE 5

| Welding No. | Thickness of steel plate (mm) | Welding speed (cm/minute) | First electrode | | | Second electrode | | | Third electrode | | |
|---|---|---|---|---|---|---|---|---|---|---|---|
| | | | Wire diameter (mm) | Current (A) | Voltage (V) | Wire diameter (mm) | Current (A) | Voltage (V) | Wire diameter (mm) | Current (A) | Voltage (V) |
| 1 | 25 | 90  | 1.4 | 500  | 27 | 1.4 | 400 | 33 |     |     |    |
| 2 | 33 | 125 | 1.6 | 850  | 28 | 1.4 | 550 | 33 | 1.4 | 450 | 33 |
| 3 | 38 | 120 | 2.0 | 1050 | 28 | 2.0 | 600 | 33 | 1.4 | 450 | 33 |
| 4 | 25 | 90  | 1.2 | 400  | 27 | 1.2 | 350 | 31 |     |     |    |
| 5 | 25 | 90  | 1.6 | 550  | 27 | 1.6 | 400 | 33 |     |     |    |
| 6 | 33 | 125 | 1.6 | 850  | 28 | 1.4 | 550 | 33 | 1.4 | 450 | 33 |
| 7 | 38 | 120 | 2.0 | 1050 | 28 | 2.0 | 600 | 33 | 1.4 | 450 | 33 |

| Welding No. | Fourth electrode | | | Welding heat input (kJ/cm) | Current density of first electrode (A/mm²) | Distance between electrodes | | |
|---|---|---|---|---|---|---|---|---|
| | Wire diameter (mm) | Current (A) | Voltage (V) | | | 1 to 2 (mm) | 2 to 3 (mm) | 3 to 4 (mm) |
| 1 |     |     |    | 17.8 | 324.8 | 20 |    |    |
| 2 |     |     |    | 27.3 | 422.8 | 25 | 20 |    |
| 3 | 1.2 | 350 | 33 | 37.8 | 344.2 | 28 | 25 | 25 |
| 4 |     |     |    | 14.4 | 353.7 | 15 |    |    |
| 5 |     |     |    | 18.7 | 273.5 | 18 |    |    |
| 6 |     |     |    | 27.3 | 422.8 | 35 | 20 |    |
| 7 | 1.2 | 350 | 33 | 37.8 | 334.2 | 28 | 25 | 25 |

TABLE 6

| Welding No. | Distance between electrodes (mm) | First electrode | | | Second electrode | | | Third electrode | | |
|---|---|---|---|---|---|---|---|---|---|---|
| | | Wire diameter (mm) | Current (A) | Voltage (V) | Wire diameter (mm) | Current (A) | Voltage (V) | Wire diameter (mm) | Current (A) | Voltage (V) |
| 1 | 130 | 4.0 | 950  | 28 | 4.0 | 750 | 30 |     |     |    |
| 2 | 160 | 3.2 | 700  | 30 | 4.0 | 550 | 33 | 4.0 | 750 | 35 |
| 3 | 200 | 3.2 | 1050 | 30 | 4.0 | 800 | 34 | 4.0 | 700 | 34 |
| 4 | 130 | 4.0 | 850  | 28 | 4.0 | 700 | 30 |     |     |    |
| 5 | 130 | 3.2 | 950  | 28 | 4.0 | 750 | 30 |     |     |    |
| 6 | 160 | 3.2 | 700  | 30 | 4.0 | 550 | 33 | 4.0 | 750 | 35 |
| 7 | 200 | 3.2 | 1050 | 30 | 4.0 | 800 | 34 | 4.0 | 700 | 34 |

| Welding No. | Fourth electrode | | | Welding heat input (kJ/cm) | Current density of first electrode (A/mm²) | Current ratio | σ* (J) | Remark |
|---|---|---|---|---|---|---|---|---|
| | Wire diameter (mm) | Current (A) | Voltage (V) | | | | | |
| 1 |     |     |    | 32.7 | 75.6  | 0.79 | 87.0  | Inventive example |
| 2 |     |     |    | 31.4 | 87.0  | 0.79 | 131.0 | Inventive example |
| 3 | 4.0 | 700 | 35 | 53.5 | 130.6 | 0.76 | 117.0 | Inventive example |
| 4 |     |     |    | 29.9 | 67.6  | 0.82 | 48.0  | Comparative example |
| 5 |     |     |    | 32.7 | 118.1 | 0.79 | 44.0  | Comparative example |
| 6 |     |     |    | 31.4 | 87.0  | 0.79 | 126.0 | Inventive example |
| 7 | 4.0 | 700 | 35 | 53.5 | 130.6 | 0.76 | 121.0 | Inventive example |

*σ: Absorption energy of HAZ at −40° C.

TABLE 7

| Welding No. | Thickness of steel plate (mm) | Welding speed (cm/minute) | First electrode Wire diameter (mm) | First electrode Current (A) | First electrode Voltage (V) | Second electrode Wire diameter (mm) | Second electrode Current (A) | Second electrode Voltage (V) | Third electrode Wire diameter (mm) | Third electrode Current (A) | Third electrode Voltage (V) |
|---|---|---|---|---|---|---|---|---|---|---|---|
| 8 | 25 | 60 | 1.4 | 500 | 27 | 1.4 | 400 | 33 | | | |
| 9 | 33 | 120 | 1.6 | 850 | 28 | 1.4 | 550 | 33 | 1.4 | 450 | 33 |
| 10 | 38 | 125 | 2.0 | 1050 | 28 | 2.0 | 600 | 33 | 1.4 | 450 | 33 |
| 11 | 25 | 60 | 1.2 | 400 | 27 | 1.2 | 350 | 31 | | | |
| 12 | 25 | 60 | 1.6 | 550 | 27 | 1.6 | 400 | 33 | | | |
| 13 | 33 | 120 | 1.6 | 850 | 28 | 1.4 | 550 | 33 | 1.4 | 450 | 33 |
| 14 | 38 | 115 | 1.6 | 800 | 28 | 2.0 | 600 | 33 | 1.4 | 450 | 33 |

| Welding No. | Fourth electrode Wire diameter (mm) | Fourth electrode Current (A) | Fourth electrode Voltage (V) | Welding heat input (kJ/cm) | Current density of first electrode (A/mm$^2$) | Distance between electrodes 1 to 2 (mm) | Distance between electrodes 2 to 3 (mm) | Distance between electrodes 3 to 4 (mm) |
|---|---|---|---|---|---|---|---|---|
| 8 | | | | 26.7 | 324.8 | 15 | | |
| 9 | | | | 28.4 | 422.8 | 20 | 20 | |
| 10 | 1.2 | 350 | 33 | 36.3 | 344.2 | 25 | 25 | 25 |
| 11 | | | | 21.7 | 353.7 | 18 | | |
| 12 | | | | 28.1 | 273.5 | 18 | | |
| 13 | | | | 28.4 | 422.8 | 35 | 20 | |
| 14 | 1.2 | 350 | 33 | 35.8 | 397.9 | 28 | 25 | 25 |

TABLE 8

| Welding No. | Distance between electrodes (mm) | First electrode Wire diameter (mm) | First electrode Current (A) | First electrode Voltage (V) | Second electrode Wire diameter (mm) | Second electrode Current (A) | Second electrode Voltage (V) | Third electrode Wire diameter (mm) | Third electrode Current (A) | Third electrode Voltage (V) |
|---|---|---|---|---|---|---|---|---|---|---|
| 8 | 50 | 4.0 | 550 | 28 | 4.0 | 550 | 30 | | | |
| 9 | 90 | 4.0 | 850 | 30 | 4.0 | 800 | 33 | 4.0 | 750 | 35 |
| 10 | 70 | 3.2 | 1000 | 30 | 4.0 | 900 | 34 | 4.0 | 800 | 34 |
| 11 | 130 | 4.0 | 550 | 28 | 4.0 | 550 | 30 | | | |
| 12 | 80 | 4.0 | 550 | 28 | 4.0 | 550 | 30 | | | |
| 13 | 90 | 4.0 | 850 | 30 | 4.0 | 800 | 33 | 4.0 | 750 | 35 |
| 14 | 90 | 4.0 | 900 | 31 | 4.0 | 850 | 34 | 4.0 | 800 | 34 |

| Welding No. | Fourth electrode Wire diameter (mm) | Fourth electrode Current (A) | Fourth electrode Voltage (V) | Welding heat input (kJ/cm) | Current density of first electrode (A/mm$^2$) | σ* (J) | Remark |
|---|---|---|---|---|---|---|---|
| 8 | | | | 31.9 | 43.8 | 98.0 | Inventive example |
| 9 | | | | 39.1 | 67.6 | 131.0 | Inventive example |
| 10 | 4.0 | 700 | 35 | 53.9 | 124.3 | 117.0 | Inventive example |
| 11 | | | | 31.9 | 43.8 | 48.0 | Comparative example |
| 12 | | | | 31.9 | 43.8 | 44.0 | Comparative example |
| 13 | | | | 37.2 | 67.6 | 138.0 | Inventive example |
| 14 | 4.0 | 700 | 35 | 56.6 | 71.6 | 133.0 | Inventive example |

*σ: Absorption energy of HAZ at −40° C.

The invention claimed is:

1. A combination welding method of performing gas metal arc welding on a butted portion between steel plates and performing submerged-arc welding behind the gas metal arc welding, the method comprising:
   welding a back side of the butted portion;
   welding a finishing side of the butted portion by gas metal arc welding, the gas metal arc welding step using:
     two or more electrodes;
     a wire having a diameter of 1.4 mm or more in a first electrode of the gas metal arc welding; and
     a current density of the first electrode from 320 A/mm$^2$ to 700 A/mm$^2$; and
   welding the finishing side by submerged-arc welding behind the gas metal arc welding of the finishing side such that a distance between a last electrode of the gas metal arc welding and a first electrode of the submerged-arc welding is from 40 to 100 mm, and such that the submerged-arc welding is conducted before a melted metal of the gas metal arc welding is completely solidified,
   wherein the heat of the gas metal arc welding is deeply input in the thickness direction of a steel plate, the heat of the submerged-arc welding is input to a surface layer side thereof, and an upside of weld metal formed by the gas metal arc welding is melted again by the submerged-arc welding.

2. The combination welding method according to claim 1, wherein the submerged-arc welding is performed using two or more electrodes, and the current density of the first electrode of the submerged-arc welding is 75 A/mm$^2$ or more.

3. The combination welding method according to claim 1, wherein a distance between the first and second electrodes of the gas metal arc welding is 30 mm or less.

4. The combination welding method according to claim 1, wherein the first and second electrodes of the gas metal arc welding are set to have different polarities.

5. The combination welding method according to claim 1, wherein power supplies of the first and second electrodes of the gas metal arc welding are respectively pulsed power supplies, and peak currents of the first and second electrodes are supplied to be deviated from each other in time.

6. The combination welding method according to claim 1, wherein the current ratio between the first and second electrodes of the submerged-arc welding is from 0.6 to 0.8.

* * * * *